United States Patent Office 3,682,644
Patented Aug. 8, 1972

3,682,644
PROCESS FOR PREPARING MIXED FEEDS THAT CONTAIN NONPROTEIN NITROGEN
Mitsuo Nagakura, Tokyo, Japan, assignor to Telenite Co., Ltd., Tokyo, Japan
No Drawing. Filed Jan. 5, 1970, Ser. No. 836
Int. Cl. A23k 1/00, 1/12
U.S. Cl. 99—2 R     6 Claims

ABSTRACT OF THE DISCLOSURE

Chlorinated, nitrated, nitrochlorinated and sulfonated humic and fulvic acids and salts thereof have been found to be effective growth promoting agents for livestock. Such materials are preferably obtained from the nitration, sulfonation or chlorination of lignite or peat.

---

This invention relates to a process for preparing livestock feeds characterized by the addition of lignite, peat and/or a material or materials obtained by certain treatments of lignite and/or peat to base mixtures.

The inventor found that a small amount or amounts of lignite and/or peat with or without processing can notably enhance the feed value when mixed in rations for livestock, and that this is ascribable to alkali-soluble constituents of these materials. Lignite and peat (for the purpose of this invention) these terms as used herein mean the varieties of coal of relatively recent and more recent origins, respectively, both having carbon contents of not more than 80 percent as determined by elementary analysis generally contains substances soluble in dilute alkali solutions. Of these soluble constituents, those insoluble in acids are, for the most part, humic acids, whereas the soluble in acids are largely fulvic acids. The humic acids and fulvic acids are carboxylic acids of relatively high molecular compounds.

When materials containing these acids as effective ingredients are added to livestock feeds, they have many diverse beneficial actions and effects, such as inhibition of oxidation and promotion of dispersion for fats in feeds actions as chelating agents for metallic ions in feeds, prevention of inactivation of additives such as antibiotics and vitamins which are used in very small amounts, facilitation of digestion, regulation of the intestines of the animals, and promotion of fermentation and reproduction of useful bacteria, protozoa and other microorganisms in the ruminative stomachs, particularly in the rumens of the ruminant animals.

Feed mixtures including lignite, peat or processed products thereof that contain humic acids or fulvic acids may be given to pigs without offensive smell because the oils and fats of the feeds are kept from oxidation and, moreover, the digestion and absorption of the feeds in vivo are facilitated by rapid dispersion of the feeds in the digestive organs. Minerals and trace additives, e.g., antibiotics and vitamins, retain their original values little affected because their inactivation due to mutual reaction is avoided. In the animal body they still are kept from becoming inactive. Furthermore, the humic acids and fulvic acids as effective ingredients act to adsorb toxious substances formed by anaerobic fermentation in the digestive tract, offer a buffer action against the fluctuations of pH values of the digestive fluids, and encourage the activities of digestive enzymes. These actions of the acids lead to increases or improvements in animal appetite, palatability of feeds, digestion and absorption, weight gains, and feed efficiency, and also to a decrease in the frequency of infliction with diseases.

When ruminants such as cattle, goats and sheep are fed with feeds prepared by adding humic acid or fulvic acid containing materials to usual feed mixtures free from artificial nonprotein nitrogen compounds, the acids as effective ingredients promote fermentation in the ruminative stomachs centered around the rumens, buffer the fluctuations of pH values of digestive fluids, especially the gastric juice, and enhance the values of minerals and trace addition agents. The feeds prepared in accordance with the present invention, therefore, improve the appetite and palate of the livestock, the rates of their weight gains, and increase the milk secretion of lactating dairy cattle, thus attain high feed efficiencies.

Further, in the case where the ruminants such as cattle, goats and sheep are fed with diets prepared by adding humic acid or fulvic acid containing materials to feed mixtures artificially enriched with such a chemical product of nonprotein nitrogen as urea, urea derivatives, urea condensates, ammonia or ammonia salts, the humic acids and fulvic acids as the effective ingredients in the feeds exhibit a number of beneficial actions and effects. They promote the propagation of useful microorganisms, such as bacteria and protozoa, in the rumen, enliven the enzyme activities and accelerate fermentation in the ruminative stomachs, especially in the rumen, inhibit any sharp rise of the free ammonia concentration due to the hydrolysis of nonprotein nitrogen in the rumen, prevent a dangerous increase of the ammonium concentration in blood that can take place in one to two hours after feeding, and improve the rate at which nonprotein nitrogen added to the feeds is converted into amino acid or protein nitrogen. Consequently, the present invention makes possible the elimination of the common defects of conventional feeds containing ordinary chemical products of nonprotein nitrogen, i.e., the danger of ammonia poisoning, poor palatability, and low feed efficiency. Moreover, the feeds according to the present invention bring rapid weight gains, good meat quality, and, when eaten by milking cows permit plentiful secretion of milk with high fat value. The great safety ensured by the invention against ammonia poisoning, makes it feasible to increase the proportion of nonprotein nitrogen in the total nitrogen content of the individual feed mixtures, and to increase the rate of relative cheap feedstuff in feed mixtures, thus the feed can be manufactured very economically by this invention.

The present invention is practiced in the following manner.

Lignite, peat and other similar coal varieties of recent origins contain humic acids and fulvic acids. The larger the contents of these acids, and the higher the activities of such acids, the better the results. The contents and activities of these acids in lignite and peat depend largely upon the sources and the locations or mines from where they are obtained. In the case where the humic-acid and fulvic-acid contents are large and their activities high, the lignite or peat can be directly dried, ground and mixed with other ingredients to prepare mixed feeds. Lignite or peat of the grade having less humic-acid and fulvic-acid contents can be subjected to a suitable treatment to increase the acid contents and heighten their activities. Applicable treatments include oxidation, extraction with alkali, and purification with acid. Oxidation may be effectively carried out through a treatment with an oxidant, e.g., $HNO_3$, $NO_2$, $N_2O_5$, $HCL$, $CL_2$, $H_2SO_4$, $H_2SO_5$, $SO_3$, $HMnO_4$ or other metallic peroxide, or salts thereof, or halogeno acids or salts thereof, or with air or oxygen at elevated temperature. For example, when lignite or peat is treated with nitric acid, nitrohumic and nitrofulvic acids are formed. The contents of these acids in the treated material increase proportionally with the amount of nitric acid used, and at the same time, the carboxyl radicals, phenolic hydroxyl radicals, quinone structures and other contents per unit weight of the nitrohumic acids or nitrofulvic acids are increased, activity is heightened, and the molecular polarity is intensified. Accordingly, biochemical actions such as propagation of useful microorganism as bacteria and protozoa, and promotion of fermentation are increased. Moreover, physico-chemical actions including acceleration of fat dispersion and chelating actions on metallic ions are also intensified.

Referential Examples 1 and 2 given below illustrate the relations between the proportions of nitric acid used in the treatment of lignite and peat, and the contents and total acidities of humic acids (nitrohumic acids) and fulvic acids (nitrofulvic acids) in the products.

REFERENTIAL EXAMPLE 1

[Acids contents of lignite treated with different proportions of nitric acid]

| Rate of treatment HNO₃/lignite | Humic acid Content (percent) | Humic acid Total acidity (NaOH mg./g.) | Fulvic acid Content (percent) | Fulvic acid Total acidity (NaOH mg./g.) |
|---|---|---|---|---|
| Not treated | 10.8 | 197 | 2.3 | 271 |
| 0.4 | 50.2 | 228 | 6.3 | 318 |
| 0.6 | 62.3 | 249 | 12.5 | 359 |
| 0.8 | 68.1 | 281 | 16.2 | 385 |
| 1.0 | 61.1 | 304 | 20.2 | 412 |

REFERENTIAL EXAMPLE 2

[Acids contents of lignite treated with different proportions of nitric acid]

| Rate of treatment HNO₃/peat | Humic acid Content (percent) | Humic acid Total acidity (NaOH mg./g.) | Fulvic acid Content (percent) | Fulvic acid Total acidity (NaOH mg./g.) |
|---|---|---|---|---|
| Not treated | 20.3 | 155 | 5.1 | 242 |
| 0.2 | 25.8 | 199 | 12.6 | 308 |
| 0.4 | 26.9 | 220 | 27.2 | 316 |
| 0.6 | 23.3 | 232 | 36.3 | 347 |
| 0.8 | 18.3 | 247 | 42.7 | 372 |

Lignite and peat give chlorohumic acids and chlorofulvic acids when treated with hydrochloric acid or chlorine, and afford sulfonated humic acids and sulfonated fulvic acids when treated with sulfuric acid, persulfic acid, or super trioxide. These mineral acids are effective as well. Oxidation of lignite and peat with a combination of two or more different oxidants, for example a treatment with nitric acid followed by a chlorine treatment, results in formation of chloronitrohumic acids and chloronitrofulvic acids, which also have similar beneficial effects.

By extracting lignite, peat or an oxidized product thereof with a caustic alkali solution, and drying the extract solution, it is possible to obtain high purity alkali salts of humic acids and fulvic acids. These alkali salts, when washed with a mineral acids and then with water and finally dehydrated, yield humic acids of relatively high purity.

When a suitably controlled amount of an alkaline material (e.g. an alkaline material containing an alkali metal such as sodium or potassium, or an alkali earth metal such as calcium or magnesium, or ammonia) is added to lignite, peat or a material obtained by treating lignite or peat through oxidation and extraction in the manner above described, a part or whole of the acidic radicals of the humic acids and fulvic acids contained as the constituents can be neutralized. If a substance containing Fe, Mn, Zn, Cu and/or other elements essential for farm animals are added, either directly or after neutralization with an alkaline material, to lignite, peat or a treated product thereof, the reaction of the mixture gives birth to corresponding salts of humic acids and fulvic acids. The materials obtained in this way are blended, in the form of powders, grains, pellets, or solutions, in other feed components to provide mixed feeds. In this case, the materials may be mixed beforehand with other feed ingredients for use as premixes.

The present invention is illustrated by the following examples, which are in no way restrictive.

EXAMPLE 1

Lignite (having a moisture content of 38.4%) was crushed on a crusher to a size about 5 to 15 mm. in diameter, and then was ground on a grinding mill to a powder having a particle size distribution such that 95% passed a 30-mesh sieve, 68% passed a 60-mesh sieve, and 29% passed a 100-mesh sieve. Then the powder was dried by a dryer. The powdery product of lignite thus obtained had the following composition:

|   | Percent |
|---|---|
| Moisture | 16.8 |
| Alkali-solubles | 66.8 |
| Humic acids | 56.4 |
| Fulvic acids | 6.3 |
| Ash | 9.3 |

Using this product, a feed mixture of the following proportions was prepared:

TABLE 1.—COMPOSITION OF MIXED FEED FOR BEEF CATTLE

|   | Kg. |
|---|---|
| Wheat bran | 2,200 |
| Rice bran | 400 |
| Alfalfa meal | 1,500 |
| Shredded rice straw | 1,000 |
| Molasses | 500 |
| Urea | 200 |
| Powder of lignite | 200 |
| Grain sorghum | 1,500 |
| Corn | 1,000 |
| Soybean meal | 500 |
| Starch pulp | 500 |
| Fish meal | 300 |
| Common salt | 150 |
| Minerals [1] | 200 |
| Vitamins | Some |

[1] Minerals include phosphate, ferric chloride, zinc chloride, etc.

The feed prepared in accordance with the formulation as given above was given to 10-months-old beef cattle, and the feeding test was continued with the same diet for three months. The test animals were grouped into two lots, one exemplary and one control. The control lot was fed with a feed mixture of the same formulation as tabled above but free from the powder of lignite.

The test results are given in the following table.

TABLE 2.—RESULTS OF FEEDING TESTS ON BEEF CATTLE

|   | Number of head | Average daily consumption, kg. | Average daily weight gain, kg. | Feed per 100 kg. of weight gain, kg. |
|---|---|---|---|---|
| Exemplary test lot | 10 | 10.41 | 1.125 | 925 |
| Control lot | 10 | 9.26 | 0.822 | 1,128 |

As the test results indicate, the test lot was distinctly superior to the control lot in the feed consumption, weight gain, and in the economy of feed supply per 100 kg. of the weight gain. Since the feed mixture according to the present invention for the exemplary lot comprised high proportions of relatively low priced ingredients such as alfalfa, rice straw, and wheat bran, the material cost was considerably low compared with the ordinary feed on the market.

EXAMPLE 2

Peat (containing 85.1% water) was dehydrated by dehydrating rolls, dried by a dryer, and ground by a grinding mill to a powdery state ranging in diameter from about 0.2 to 1.5 mm.

Upon a chemical analysis, the product was found to comprise the following:

| | Percent |
|---|---|
| Humic acid | 28.3 |
| Fulvic acid | 4.8 |
| Moisture | 18.5 |
| Ash | 11.1 |

EXAMPLE 3

To 100 parts of lignite powder (41.5% water, 9.7% ash, and 3.4% alkali-solubles) was added 157 parts of nitric acid with specific gravity of 1.18. The mixture was reacted for oxidation at 80° to 90° C. for one hour. The resultant was centrifuged and the solid matter so obtained was washed with water and dried. A dark brownish powdery product was obtained. A chemical analysis showed that this product comprised the following:

| | Percent |
|---|---|
| Humic acid (nitrohumic acid) | 62.4 |
| Fulvic acid (nitrofulvic acid) | 6.9 |
| Moisture | 17.2 |

EXAMPLE 4

To lignite powder (23.7% water, 10.4% ash, and 48% alkali-solubles) were added 8.9 parts of caustic soda crystals and 300 parts of water, and the mixture was agitated at 90° to 100° C. for one hour for the extraction of the alkali-soluble matter. After centrifugal separation of the alkali-solubles substances, the solution containing the alkali-solubles was dried by a spray dryer to obtain a powdery product. An analysis indicated that the product comprised the following:

| | Percent |
|---|---|
| Sodium salt of humic acid | 67.4 |
| Sodium salt of fulvic acid | 10.3 |
| Moisture | 12.2 |

EXAMPLE 5

100 parts of the product obtained by the procedure described in Example 4 was added to 1,000 parts of sulfuric acid having specific gravity of 1.2. The mixture in the form of a suspension was agitated and the solid matter was separated. Next, the solid matter was washed with abundant water and dried by a dryer. A purified product in powdery form resulted. This product was analyzed to comprise the following:

| | Percent |
|---|---|
| Humic acid | 71.3 |
| Fulvic acid | 3.9 |
| Ash | 4.2 |
| Moisture | 16.3 |

EXAMPLE 6

To 100 parts of peat (48.3% water, 8.8% ash, and 11.5% alkali-solubles) were added 50 parts of nitric acid with specific gravity of 1.32 and 3 parts of sulfuric acid, sp. gr. 1.8. An oxidation reaction of the mixture was thus carried out at 90° to 100° C. for 2 hours. The muddy reaction product was dried and ground. Major components of the powdered product was analyzed to be as follows:

| | Percent |
|---|---|
| Humic acid (nitrohumic acid) | 22.3 |
| Fulvic acid (nitrofulvic acid) | 30.8 |
| Moisture | 18.4 |

EXAMPLE 7

100 parts of peat (34.2% water, 11.9% ash, and 13.8% alkali-solubles) was subjected to an oxidation-decomposition reaction with the addition of 85 parts of nitric acid, sp. gr. 1.22, at 90° to 100° C. for 2 hours. The resultant was neutralized with 4 parts of caustic soda crystals and 3 parts of lime, and then reacted with 1 part of ferric chloride, 4 parts of ammonia phosphate, 1 part of magnesium hydroxide, 0.5 part of manganese chloride, 1 part of zinc chloride, 0.05 part of copper hydroxide, and 0.005 part of calcium iodide. The reaction product was dried to obtain a product containing composite salts of humic acid (nitrohumic acid) and fulvic acid (nitrofulvic acid).

EXAMPLE 8

The product according to Example 3 was reacted through contact with gaseous chlorine at normal temperature for 15 minutes. The reaction product, upon washing with water and drying, yielded a product containing humic acid (chloronitrohumic acid) and fulvic acid (chloronitrofulvic acid).

EXAMPLE 9

50 parts of a 25% NaOH solution was added to 100 parts of the solid matter obtained in accordance with Example 3 after centrifugal separation and washing with water. After mixing and reaction for 20 minutes, the resultant was dried, when a product containing sodium salts of humic acid (sodium salt of nitrohumic acid) and sodium salts of fulvic acid (sodium salt of nitrofulvic acid) was obtained.

EXAMPLE 10

1 part of lime was added to 100 parts of the solid matter obtained in accordance with Example 3, and the mixture was reacted at 50° to 60° C. for 30 minutes, after centrifugal separation and washing with water and the resultant was dried. The product contained substances formed by partial neutralization of humic acid (nitrohumic acid) and fulvic acid (nitrofulvic acid) with lime.

EXAMPLE 11

The products obtained by procedures described in the preceding examples were added to the feed mixtures of the following formulation in proportions as given in Table 3 "Results of feeding tests on pigs" and the test feeds thus prepared were supplied to lots of 160 days old pigs. The test was continued for a period of 90 days.

The constituents of the feed for the control lot were as follows:

| | |
|---|---|
| Corn | Zinc oxide |
| Grain sorghum (milo) | Manganese chloride |
| Rice bran | Ferrous carbonate |
| Wheat bran | Cuprous oxide |
| Soybean meal | Cobalt oxide |
| Fish meal | Potassium iodide |
| Monocalcium phosphate | Vitamins A and D |
| Calcium carbonate | Flavoring materials |
| Magnesium carbonate | Antibiotics |
| Common salt | |

TABLE 3.—RESULTS OF FEEDING TESTS ON PIGS

| Percentage of | Control lot | Test lot | | | | | | |
|---|---|---|---|---|---|---|---|---|
| | | Ex. 1, product | Ex. 2 | Ex. 3 | Ex. 5, 0.5% Ex. 7, 0.5% | Ex. 6, 0.5% Ex. 7, 0.5% | Ex. 8, 1% | Ex. 9, 0.5% Ex. 10, 0.5% |
| Product of example, added | 0 | 1.5% | 2.5% | 1.0% | 0.5% | 0.5% | | 0.5% |
| Number of head | 10 | 10 | 9 | 10 | 10 | 9 | 10 | 10 |
| Initial average body weight (kg.) | 38.6 | 37.9 | 38.5 | 38.8 | 38.3 | 38.9 | 39.1 | 37.9 |
| Final average body weight (kg.) | 81.4 | 83.6 | 83.2 | 85.5 | 84.9 | 84.9 | 87.2 | 84.9 |
| Average weight gain per day (kg.) | 0.476 | 0.502 | 0.496 | 0.519 | 0.517 | 0.510 | 0.535 | 0.520 |
| Average feed consumption per day (kg.) | 1.98 | 2.02 | 2.04 | 2.08 | 2.08 | 2.06 | 2.11 | 2.04 |
| Weight of feed consumed per 100 kg. of weight gain (kg.) | 416 | 402 | 412 | 401 | 402 | 404 | 394 | 392 |

As will be obvious from the table showing the test results, the test lots fed by the rations according to the present invention invariably displayed greater weight gains with less feed consumptions per 100 kg. of the weight increased than did the control lots.

EXAMPLE 12

Lots of milking cows were fed either with the feeds of the formulations given in Table 4 (control lots) or with the above feeds plus the products according to the preceding examples (exemplary lots) for 50 days, and the quantities and qualities of the milks secreted were examined. In addition to those feeds, the cattle were supplied with hays and water freely as desired.

TABLE 4.—COMPOSITIONS OF FEEDS

| Composition | Control lot— | |
|---|---|---|
| | No. 1 without urea, percent | No. 2 with urea, percent |
| Corn | 22 | 32.2 |
| Oat | 5 | 5 |
| Grain sorghum | 15 | 20 |
| Wheat bran | 25 | 25 |
| Molasses | 13 | 13 |
| Soybean meal | 18 | 0 |
| Urea | 0 | 2.8 |
| Dicalcium phosphate | 0.6 | 0.6 |
| Common salt (containing trace minerals) | 1.0 | 1.0 |
| Vitamins A and D | (¹) | (¹) |
| Antibiotics | (¹) | (¹) |

¹ Adequate amount.

PROXIMATE INGREDIENTS

| | | |
|---|---|---|
| Crude protein | 16.68 | 16.94 |
| Ether extract | 2.65 | 3.00 |
| Crude fiber | 4.79 | 4.02 |
| Ash | 5.6 | 4.7 |
| Nitrogen free extract | 61.9 | 64.0 |

TABLE 5.—TEST RESULTS ON MILKING COWS

| | Control lot number | | Test lot number | | | |
|---|---|---|---|---|---|---|
| | 1 | 2 | 1a | 2a | 1b | 2b |
| Amount of urea added percent | 0 | 2.8 | 0 | 2.8 | 0 | 2.8 |
| Amount of product according to example added (percent) | 0 | 0 | Ex. 3, 1.2 | Ex. 3, 1.2 | Ex. 7, 0.5, Ex. 10, 0.7 | Ex. 7, 0.5, Ex. 10, 0.7 |
| No. of head per lot | 4 | 4 | 4 | 4 | 4 | 4 |
| Average milk production (kg./day) | 16.64 | 15.74 | 17.42 | 17.88 | 17.54 | 17.87 |
| Average milk fat content (percent) | 3.62 | 3.53 | 3.62 | 3.63 | 3.64 | 3.64 |
| Average milk fat production (kg./day) | 0.60 | 0.55 | 0.63 | 0.64 | 0.62 | 0.65 |
| Average 4% F.C.M. production (kg./day) | 15.65 | 14.55 | 16.42 | 16.75 | 16.32 | 16.89 |

As can be seen from the test results, the test lots fed with the rations prepared in accordance with the process of the invention showed better results than did the control lots. This was particularly effective with the feeds according to the invention which contained urea. The test results demonstrate the advantageous effects of the combinations of a nonprotein nitrogen compound such as urea with lignite, peat or a processed product thereof.

REFERENTIAL EXAMPLE 3

100 parts of each of the products according to Examples 1 to 10 was thoroughly mixed with 100 parts of ammonia sulfate and 50 parts of common salt, when the ammonia sulfate and common salt partially deliquesced to a non-dusting powdery product. The non-dusting quality rendered the product easy to handle in mixing it in other feed materials.

REFERENTIAL EXAMPLE 4

100 parts of each of the products according to Examples 1 to 10 was thoroughly mixed with 100 to 300 parts of powdered urea. With partial deliquescence of the urea, a non-dusting powdery product resulted. The product exhibited the same effect as in Referential Example 3.

REFERENTIAL EXAMPLE 5

To 100 parts of urea in a granular form (0.5 to 3 mm. in diameter) was added 20 to 70 parts of each of the products obtained in accordance with Examples 1 to 10. The two were mixed up in a rotary drum, and a granular material coinsisting of urea granules coated uniformly with the product according to the invention could be obtained. This granular material had no tendency for dust development and, at the same time, the moisture absorption of the urea was inhibited to a considerable extent.

I claim:
1. A method of feeding livestock which comprises feeding said livestock as feed containing nitrofulvic, nitrohumic, chloronitrohumic, chloronitrofulvic, sulfonated humic or sulfonated fulvic acid and non-toxic salts thereof.

2. A method of feeding livestock according to claim 1 wherein the salts are selected from the group consisting of alkali metal, alkaline earth metal and ammonium salts.

3. A method of feeding livestock according to claim 1 wherein the salts are of elements essential for the growth of said livestock.

4. A method of feeding livestock according to claim 3 wherein the salts are selected from the group consisting of Fe, Mn, Zn and Cu salts.

5. A method of feeding livestock according to claim 1 wherein the feed contains nitrohumic or nitrofulvic acid or non-toxic salts thereof produced by nitrating 100 parts lignite with 157 parts nitric acid of specific gravity 1.18 at 80° to 90° C. for one hour.

6. A method of feeding livestock according to claim 1 wherein the feed contains nitrohumic or nitrofulvic acid or non-toxic salts thereof produced by nitrating 100 parts of peat with 50 parts nitric acid of specific gravity 1.32 and 3 parts of sulfuric acid of specific gravity 1.8 or with 85 parts nitric acid of specific gravity 1.22, at 90° to 100° C. for 2 hours.

References Cited

UNITED STATES PATENTS

| | | | |
|---|---|---|---|
| 3,264,084 | 8/1966 | Karcher | 71—24 |
| 1,668,464 | 5/1928 | Pease | 71—43 |
| 2,027,766 | 1/1936 | Davis et al. | 71—24 |
| 2,048,658 | 7/1936 | Jannek et al. | 71—24 |
| 2,178,051 | 10/1939 | Sams | 99—2 |
| 3,370,953 | 2/1968 | Nakano | 99—2 |

FOREIGN PATENTS

| | | | |
|---|---|---|---|
| 4,359 | 6/1901 | Great Britain | 99—2 |

NORMAN YUDKOFF, Primary Examiner

C. P. RIBANDO, Assistant Examiner

U.S. Cl. X.R.

99—10